March 6, 1962 J. A. KOSTER 3,024,361
TUNING AND OVERLOAD INDICATOR CIRCUIT
Filed March 9, 1959
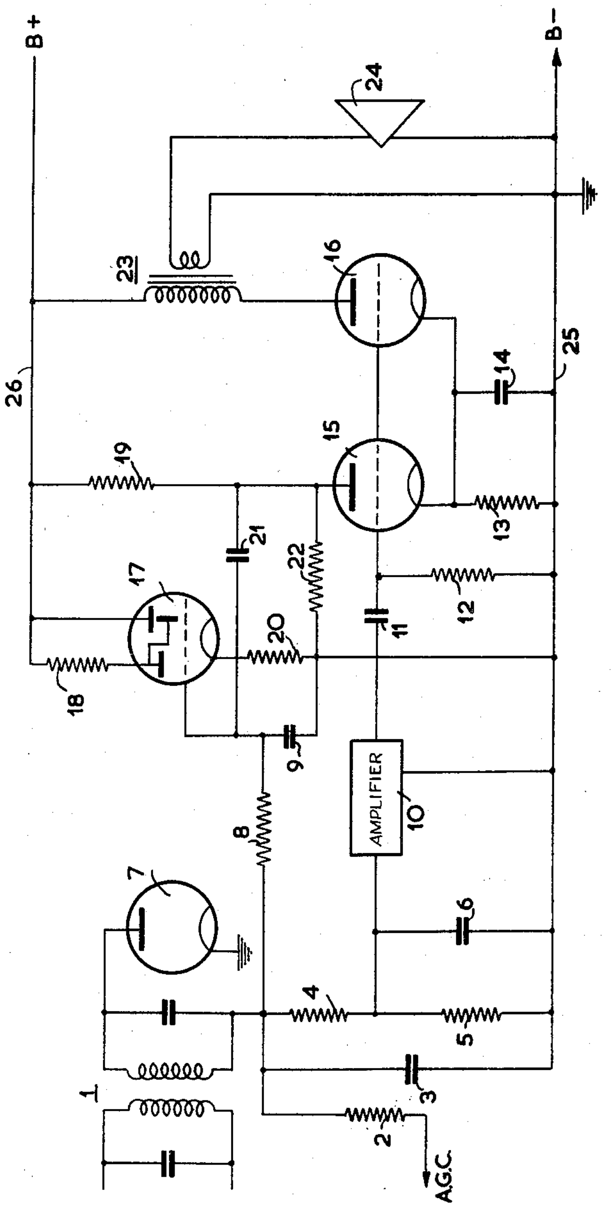
INVENTOR
JOHANNES A. KOSTER
BY
Frank R. Jifari
AGENT 3,024,361

TUNING AND OVERLOAD INDICATOR CIRCUIT

Johannes Adrianus Koster, Scarborough, Ontario, Canada, assignor to North American Philips Company, Inc., New York, N.Y., a corporation of Delaware Filed Mar. 9, 1959, Ser. No. 797,960
Claims priority, application Canada Apr. 18, 1958
4 Claims. (Cl. 250—20)

The invention relates to a tuning and overload indicator of the electron ray or magic eye type which utilizes one indicator for the simultaneous indication of radio receiver tuning and audio amplifier overload or individual indication of either of these.

In radio receivers it is common practice to use an electron ray type tuning indicator which is sensitive to a voltage indicative of correct tuning, for instance the voltage produced across the load of an amplitude modulation detector as used in a superheterodyne receiver.

Electron ray type indicators have also been used to indicate amplifier overload by applying the amplified voltage to the indicator wherein the closing of the light sector due to the deflection provided by the amplified voltage indicates the reaching of the overload point of the amplifier. The accuracy of such a system is dependent on the maintenance of constant voltages, impedance values and current emission.

The invention contemplates the use of the electron ray indicator to provide continuous indication of tuning of a radio receiver and at the same time provide an additional indication only when an overload point is reached in the audio amplifier associated with the receiver. This feature ensures that during normal operation the overload indication operation will not interfere with the accuracy of the tuning indication.

A further feature of the invention is the fact that the overload indication is responsive directly to overload conditions and does not depend on the accuracy of maintaining predetermined voltages and conditions of operation.

In carrying out the invention, cognizance is taken of the fact that when an amplifier is being driven into an overload condition, the grid to cathode voltage on the tube in which overload is being determined reaches zero or may actually become positive with respect to the cathode. The grid to cathode voltage of the amplifier under surveillance is employed as the bias for an overload indicator amplifier operating with very low plate supply. The indicator amplifier is in a cut-off condition until the bias reaches zero. A low frequency signal is applied to the control grid of the indicator amplifier and when the bias thereon reaches or exceeds zero, the signal is amplified and applied to the tuning indicator control grid and superimposed on the tuning indication voltage. Thus the overload indication is a flutter superimposed on the normal tuning indication deflection of the electron ray in the indicator.

The invention will now be described in detail with reference to the single FIGURE of the drawing showing a preferred embodiment thereof. In the drawing 1 designates an intermediate frequency transformer feeding a diode detector 7 and having a load comprised by resistors 4 and 5 associated with high frequency decoupling capacitors 3 and 6. A negative direct current voltage developed across the detector load is applied through a decoupling resistor 2 to the radio frequency amplifier stages, not shown, of the receiver to provide automatic gain control.

The audio signal voltage developed across load resistor 5 is supplied to a first amplifier 10, the output of which feeds a power amplifier tube 16. An output transformer 23 whose primary connects the anode of tube 16 to B+ conductor 26 feeds a loudspeaker 24. Operating bias for tube 16 is developed across cathode resistor 13 which is shunted to ground for audio frequencies by capacitor 14.

An electron ray or magic eye tuning indicator 17 is shown having a cathode connected to grounded conductor 25 by a resistor 20. The anode of the triode section is connected to B+ by a resistor 18 and the fluorescent anode is connected directly to B+. The detector direct current voltage output is applied to the control grid of the indicator tube through the low pass filter constituted by resistance 8 and capacitor 9. The indicator as so far described will indicate correct tuning in the regular manner.

An overload indicator amplifier tube 15 is shown having its cathode and grid connected in common with the cathode and grid respectively of amplifier tube 16. Thus the bias on tube 16 also appears on tube 15. The anode of tube 15 is connected to the junction point of two resistors 19 and 22 connected serially between B+ conductor 26 and B− conductor 25. The resistance of 19 is high compared to that of 22 and, consequently, a very low anode voltage, which may be of the order of 10 volts, is applied to tube 15. Due to this low anode voltage tube 15 will normally be cut off by the voltage produced across resistor 13 due to the conduction of tube 16. This condition will prevail until the bias on tubes 15 and 16 is reduced to approximately zero by the positive half cycles of the audio voltage being applied to the grids.

When the positive half cycle of the audio waveform reaches an amplitude at which the grid of tube 16 is driven to zero or positive with respect to its cathode a point is reached whereat overloading begins to take place. At this point tube 15 will conduct to produce a signal voltage across anode resistor 19. The signal across resistor 19 is applied to the control grid of indicator 17 by capacitor 21. Thus, when an overload condition exists in tube 16, a signal produced by the maximum positive excursion of the audio voltage at the grid of tube 16 is applied to the indicator tube 17 and superimposed on the tuning indication.

Capacitor 21 should be large in value compared to capacitor 9 in order that a substantial portion of the output signal of tube 15 appears across capacitor 9. It is to be understood, of course, that the signal output from tube 15 may be applied through the medium of a coupling transformer to the grid of tuning indicator 17.

The value of resistor 20 in the cathode circuit of tuning indicator 17 should be adjusted to give a compromise between the minimum angle of the light sector for phonograph operation (not automatic gain control voltage present) and the minimum angle of the light sector for radio operation when tuned on a weak broadcasting station.

Although the invention has been described with reference to a combined tuning and overload indicator, it should be realized the overload indicator is usable as a unit by itself and normally operates in this manner when no broadcast signal is being received, i.e. phonograph operation. In addition to this, the signal from the overload indicator 15 can also be used to drive a gain control device for peak limiting of the incoming signal.

The spirit and scope of the invention is defined by the appended claims.

What is claimed is:

1. In an overload indicator circuit, an amplifier circuit comprising, a first vacuum tube including at least a cathode, a control grid, and an anode connected to an output circuit, means biasing said control grid negative with respect to the cathode, a second vacuum tube having a cathode and control grid connected in parallel with the cathode and control grid respectively of said first vacuum tube, and an anode circuit incorporating a load impedance, means applying such a low anode voltage to said second vacuum tube so as to prevent anode current flow therein unless the grid to cathode voltage thereof approaches zero, and means coupling the said load impedance to an indicator to indicate flow of current in said second vacuum tube and overload conditions in said first vacuum tube.

2. An indicator circuit adapted to indicate overload conditions in an alternating current signal amplifier including a first vacuum tube having at least a cathode, a control grid, and an anode connected through a first load impedance to a source of supply voltage, a second vacuum tube having a cathode and a control grid connected in parallel with the cathode and control grid respectively of said first vacuum tube, and an anode connected through a second load impedance to a source of potential of such value as to eliminate current flow through said second vacuum tube unless the grid to cathode voltage thereof approaches zero, a cathode ray tube indicator and means reactively coupling said second load impedance to a control grid of said indicator to indicate the flow of current in said second vacuum tube and the presence of overload conditions in said first vacuum tube.

3. An indicating circuit adapted to indicate overload conditions in a signal amplifier, a first vacuum tube having at least a cathode, a control grid and an anode connected to a source of voltage through a load circuit, means applying a negative bias and a signal between said cathode and control grid, a second vacuum tube having a cathode and a control grid connected in parallel with the cathode and control grid respectively of said first vacuum tube, and an anode having a load impedance connected in circuit therewith, means applying such a low anode voltage to said second vacuum tube as to prevent current flow therein unless the grid to cathode voltage thereof approaches zero, and an indicator circuit reactively coupled to said impedance adapted to indicate the flow of current in said second vacuum tube due to said signal substantially neutralizing said negative bias.

4. In a radio receiver including a detector and a cathode ray type tuning indicator actuated by the application of the direct current output voltage of the detector to the control grid thereof, an audio amplifier adapted to amplify the detected alternating signal of the detector and including a first vacuum tube to the control grid of which said signal is applied, means biasing the control grid of said first tube negative with respect to its cathode, an output circuit connected to the anode of said tube, a second vacuum tube having a control grid and cathode connected in parallel with the control grid and cathode respectively of said first tube, and an anode having a load impedance connected thereto, means applying such a low voltage to the anode of said second tube as to substantially prevent current flow therethrough unless the control grid to cathode potential of said first vacuum tube approaches a value whereat overload occurs in said first tube, and reactive means coupling the signal developed across said load impedance to the control of said cathode ray indicator to indicate conditions of overload in said first vacuum tube.

References Cited in the file of this patent

UNITED STATES PATENTS

| | | |
|---|---|---|
| 2,105,410 | Daniels | Jan. 11, 1938 |
| 2,210,028 | Doherty | Aug. 6, 1940 |
| 2,457,131 | Curtis | Dec. 28, 1948 |
| 2,677,729 | Mayne | May 4, 1954 |
| 2,780,682 | Klein | Feb. 5, 1957 |
| 2,808,467 | Baumgartner | Oct. 1, 1957 |
| 2,937,272 | Atwood et al. | May 17, 1960 |

FOREIGN PATENTS

| | | |
|---|---|---|
| 303,020 | Great Britain | Apr. 22, 1930 |